Dec. 4, 1956  H. C. ELSE  2,772,528
METAL SAWING TABLE
Filed Jan. 9, 1956  2 Sheets-Sheet 1

INVENTOR.
HARRY C. ELSE
BY
Brown, Critchlow, Flick & Peckham
HIS ATTORNEYS

Dec. 4, 1956 H. C. ELSE 2,772,528
METAL SAWING TABLE

Filed Jan. 9, 1956 2 Sheets-Sheet 2

INVENTOR.
HARRY C. ELSE
BY
Brown, Critchlow, Flick & Peckham
HIS ATTORNEYS

United States Patent Office 2,772,528
Patented Dec. 4, 1956

2,772,528

METAL SAWING TABLE

Harry C. Else, Pittsburgh, Pa.

Application January 9, 1956, Serial No. 558,068

5 Claims. (Cl. 51—240)

This invention relates to tables on which metal is sawed.

Tables are in use on which metal plates are held while a rotary saw moves along the plate to cut it in two. The saw is usually the abrasive wheel type. It is not uncommon for such a saw to become pinched in the saw cut and broken.

It is among the objects of this invention to provide a table on which metal plates can be cut without the saw binding in the saw cut, and on which the plates are supported adjacent the saw by retractible means during the cutting operation.

In accordance with this invention, a pair of horizontal platens are disposed side by side in laterally spaced relation for supporting a metal plate extending across the space between them. A rotary saw travels back and forth above that space to cut the plate. Means are provided above one of the platens to clamp the plate on it. Additional means are used for clamping the plate on the other platen. The inner edge of the latter platen is pivotally mounted on a horizontal axis, and means are provided for lowering the outer edge of the same platen in order to bend the plate between the platens sufficiently to spread the saw cut, whereby to prevent the plate from pinching the saw. Between the platens there is a bar that extends lengthwise of the table, normally below the tops of the platens. Means are provided for raising the bar to press it against the plate in order to support the plate between the platens during cutting. The bar then can be lowered so that it will not interfere with movement of the next plate across the space between the two platens.

Figure 1:
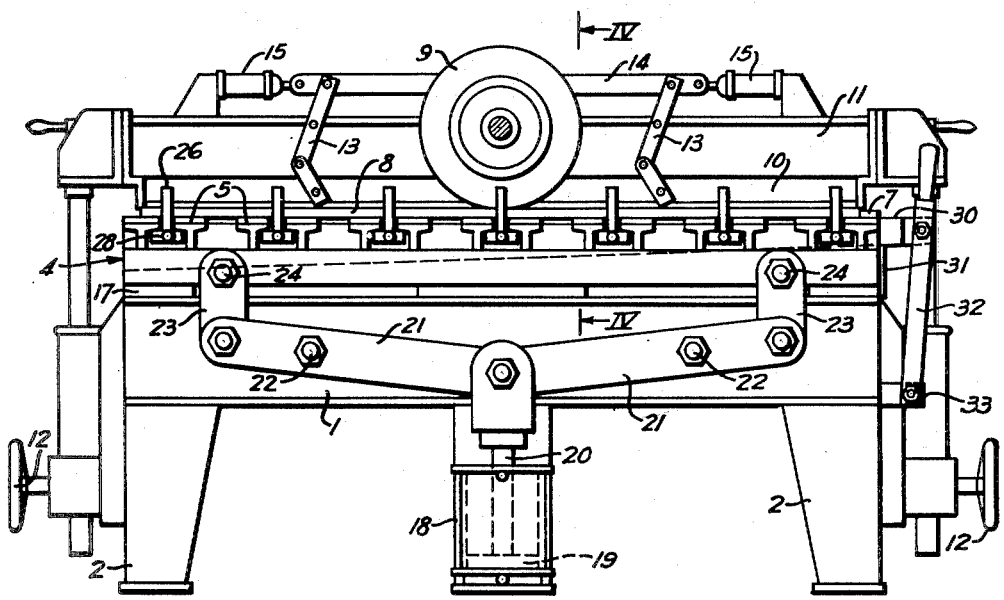
Figure 2:
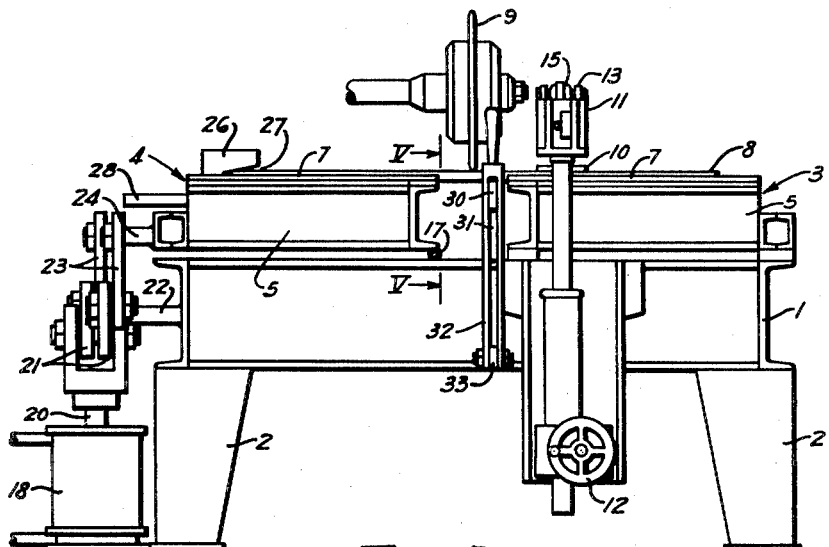
Figure 3:
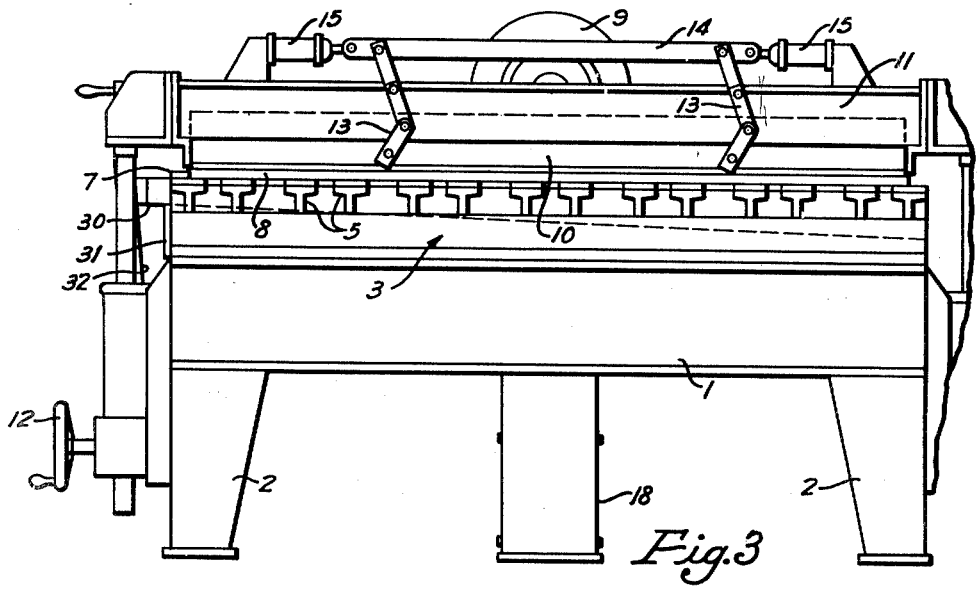
Figure 4:
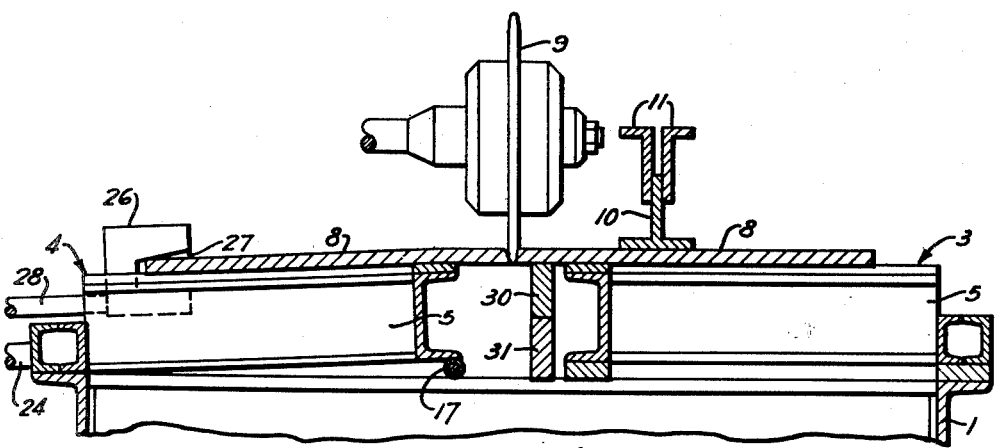
Figure 5:
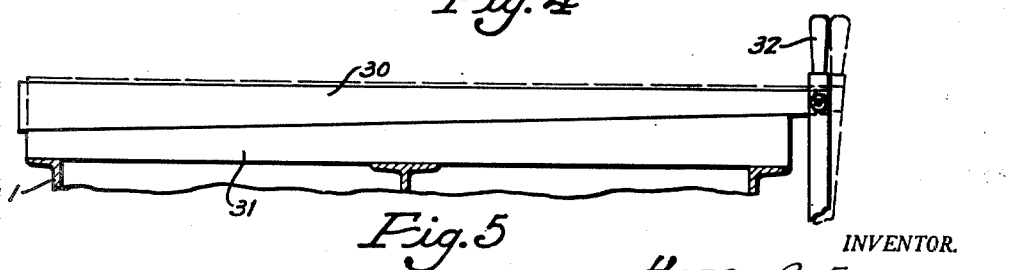

The preferred embodiment of the invention is illustrated in the accompanying drawings, in which Fig. 1 is a view of one side of my table;
Fig. 2 is an end view thereof;
Fig. 3 is a view of the other side of the table;
Fig. 4 is an enlarged fragmentary cross section taken on the line IV—IV of Fig. 1; and
Fig. 5 is a fragmentary view in longitudinal section taken on the line V—V of Fig. 2.

Referring to the drawing, the table has a rectangular frame 1 mounted on four legs 2. The frame supports two horizontal platens 3 and 4, each of which may include a row of spaced parallel rails 5. A raised straight edge 7 extends along the top of the rails at one end of the table. The two platens are spaced apart along the center of the table. If desired, vertically movable antifriction members (not shown) may be mounted between some of the rails for supporting the plate 8, which is to be cut, while it is being moved around on the table. Over the center of the space between the platens, there is a rotary saw 9, usually of the abrasive type. The saw is supported and driven in a well-known manner (not shown) and is movable lengthwise of the table and also vertically. Consequently, the saw can be moved back and forth along the table and slowly lowered in order to cut through a thick metal plate spanning the space between the two platens.

During the cutting operation, the plate is clamped tightly onto platen 3 by any suitable means, such as a clamping bar 10 extending lengthwise of the table and movable up and down in a beam 11 that can be adjusted vertically by hand wheels 12 at the opposite ends of the table. The bar may be moved up and down in the beam by toggles 13 pivotally connected to both members and to a horizontal link 14 that can be moved lengthwise of the beam by fluid pressure cylinders 15 mounted thereon. This manner of clamping a plate on a saw table is well known. Platen 3 is shown as being rigidly mounted on the table frame, although, if desired, it could be mounted in the same way as now will be explained regarding platen 4.

The platen 4 at the opposite side of the table has its inner edge pivotally connected by a hinge 17 to the table frame, and its outer edge is normally spaced above the frame so that the outer edge can be lowered in order to tilt the platen. Tilting of the platen may be accomplished in various ways, one way being by means of a fluid pressure cylinder 18 beside the table. The cylinder contains a piston 19 from which a rod 20 extends up out of the cylinder. The upper end of the rod is pivotally connected to the inner ends of a pair of levers 21 extending toward the opposite ends of the table. These levers are pivotally mounted on fulcrums 22 projecting from the side of the table frame. The outer ends of the levers are pivotally connected to the lower ends of links 23, the upper ends of which are pivotally mounted on the outer ends of rods 24 projecting from the side of the pivoted platen. When fluid pressure admitted to the lower end of the cylinder raises the piston, the levers and links tilt down the platen.

The metal plate 8 is placed on the table while the pivoted platen 4 is horizontal. After the plate has been clamped very firmly to the fixed platen by clamping bar 10 or the like, the opposite edge of the plate is clamped to the pivoted platen by suitable clamping means. A series of clamping members 26 loosely disposed between some of the platen rails is suitable for this purpose. The upright part of each of these members may be provided with an opening, such as a tapered notch 27, for receiving the edge of the plate. The clamps can be moved into and out of clamping position by handle 28 secured to their horizontal lowered portions.

Soon after starting to cut the plate, or even before, fluid pressure is supplied to the lower end of cylinder 18 in order to lower the tilting platen so that the plate will be bent down between the saw and the clamped outer edge of the plate, as shown in Fig. 4. This has the effect of slightly opening the saw cut as it is formed and thereby preventing the sides of the cut from tightly engaging the saw and causing it to bind. The saw therefore will operate more smoothly and easily, and there will be no danger of its being broken by the pinching action of the plate. The stiffness of the plate, if thick, may prevent platen 4 from tilting down at the start, but in such a case the plate will begin to bend at the cut as the thickness of the metal is reduced.

To help a more flexible plate to bend at the cut, instead of at the inner edge of the fixed platen 3, and also to firmly support the plate near the cut, it is desirable to mount a supporting bar 30 beneath the plate close to the saw on the side adjacent to the fixed platen. Although this might be a fixed bar in some cases, it is preferred to make it retractible, so that when a plate is first placed on the table and slid across the gap between the platens it will not catch on the bar. A convenient way of mounting the bar is to provide its bottom with a longitudinally inclined surface, as shown in Fig. 5, which slides on a matching inclined upper surface of a supporting member 31 rigidly mounted on the table frame. One end of the bar projects from the table and is pivotally connected to the upper part of a lever 32, the lower end of which is pivoted to a bracket 33 projecting from the table. When the upper end of the lever is pulled away from the table, the bar will be pulled up the incline and pressed tightly against the bottom of the plate. The bar moves up the incline toward the end of the table that carries straight edge 7, which will prevent the bar from moving the plate lengthwise of the table before the plate is clamped.

Wherever the word "plate" is used herein, it is to be understood to mean any workpieces that can be clamped on the table and bent at the cut during sawing.

According to the provisions of the patent statutes, I have explained the principle of my invention and have illustrated and described what I now consider to represent its best embodiment. However, I desire to have it understod that, within the scope of the appended claims, the invention may be practiced otherwise than as specifically illustrated and described.

I claim:

1. A table for metal sawing beneath a saw, comprising a pair of horizontal platens disposed side by side in laterally spaced relation and adapted to support a metal plate extending across the space between them while a rotary saw above said space is moved lengthwise thereof to cut the plate, means above one of said platens to clamp the plate thereon, means to clamp the plate on the other platen, means pivotally mounting the inner edge of said other platen on a horizontal axis, and means for lowering the outer edge of said pivoted platen to bend the plate between the platens, whereby to spread the saw cut to prevent the saw from binding therein.

2. A table for metal sawing, comprising a pair of horizontal platens disposed side by side in laterally spaced relation and adapted to support a metal plate extending across the space between them while a rotary saw above said space is moved lengthwise thereof to cut the plate, means above one of said platens adapted to clamp the plate thereon, means adapted to clamp the plate on the other platen, means pivotally mounting the inner edge of said other platen on a horizontal axis, linkage means connected with the outer edge portion of said pivoted platen, and fluid pressure means for actuating said linkage means to lower the outer edge of the pivoted platen, whereby to bend the plate between the platens so that the pressure of the plate against the sides of the saw will be relieved.

3. A table for metal sawing beneath a saw, comprising a pair of horizontal platens disposed side by side in laterally spaced relation and adapted to support a metal plate extending across the space between them while a rotary saw above said space is moved lengthwise thereof to cut the plate, means above one of said platens adapted to clamp the plate thereon, the other platen being provided with slots extending transversely of it, clamping members extending up through said slots for receiving an edge of the plate extending transversely of the slots to clamp it on said other platen, means pivotally mounting the inner edge of said other platen on a horizontal axis, and means for lowering the outer edge of said pivoted platen to bend the plate between the platens, whereby to spread the saw cut to prevent the saw from binding therein.

4. A table for metal sawing beneath a saw, comprising a pair of horizontal platens disposed side by side in laterally spaced relation and adapted to support a metal plate extending across the space between them while a rotary saw above said space is moved lengthwise thereof to cut the plate, means above one of said platens adapted to clamp the plate thereon, means adapted to clamp the plate on the other platen, a bar between the platens extending lengthwise thereof normally below the tops of the platens, means for raising said bar to press it against the plate adjacent said one platen to support the plate between the platens, means pivotally mounting the inner edge of said other platen on a horizontal axis, and means for lowering the outer edge of said pivoted platen to bend the plate between the platens, whereby to prevent the saw from binding in the saw cut.

5. A table for metal sawing, comprising a pair of horizontal platens disposed side by side in laterally spaced relation and adapted to support a metal plate extending across the space between them while a rotary saw above said space is moved lengthwise thereof to cut the plate, means above one of said platens adapted to clamp the plate thereon, means adapted to clamp the plate on the other platen, a horizontal bar between the platens extending lengthwise thereof normally below the tops of the platens, the lower surface of the bar being inclined lengthwise, supporting means below the bar having an inclined upper surface engaging said inclined surface of the bar, means for moving the bar up the inclined surface of said supporting means to press the bar against the plate adjacent said one platen in order to support the plate between the platens during cutting, means pivotally mounting the inner edge of said other platen on a horizontal axis, and means for lowering the outer edge of said pivoted platen to bend the plate between the platens, whereby to prevent the saw from binding.

References Cited in the file of this patent

UNITED STATES PATENTS

| | | |
|---|---|---|
| 914,303 | Pierce | Mar. 2, 1909 |
| 1,873,721 | Postley | Aug. 23, 1932 |
| 2,598,405 | Marchand | May 27, 1952 |
| 2,601,878 | Anderson | July 1, 1952 |
| 2,627,640 | Garnich | Feb. 10, 1953 |